United States Patent Office.

JOHN FAY, OF LACON, ILLINOIS.

Letters Patent No. 114,544, dated May 9, 1871.

IMPROVEMENT IN MEDICAL COMPOUNDS.

The Schedule referred to in these Letters Patent and making part of the same.

*To all whom it may concern:*

Be it known that I, JOHN FAY, of Lacon, in the county of Marshall and State of Illinois, have invented a new and useful Improvement in Medical Compound; and I do hereby declare that the following is a full, clear, and exact description thereof, which will enable others skilled in the art to make and use the same.

This invention and discovery relates to a new and useful medical compound to be taken internally as a remedy for cancer and cancerous diseases, scrofula, &c., and consists in the use of the ingredients hereinafter named, in about the proportions specified, and combined in the manner described.

In carrying out my invention and discovery I combine the following ingredients, viz.:

Sassafras bark, one ounce; sarsaparilla, one ounce; gum guaiacum, one ounce; water-dock, five drams; rosemary, six drams; yellow dock, six drams; sulphate of antimony, one ounce; lime, eleven drams; bay leaf, six drams; niter, one dram; blood-root, one ounce.

The sulphate of antimony must be sewed up tightly in a cloth bag or sack, and then the whole of the ingredients are mixed together and boiled for the space of six or eight hours in sufficient water to leave, after such boiling, about three and a half pints of liquid.

What remains of the sulphate of antimony in the bag after such boiling is thrown away.

When the liquid has been properly strained or filtered it is ready for bottling and use.

This compound is a sure remedy for all forms of cancer, scrofula, and kindred diseases.

Having thus described my invention,

I claim as new and desire to secure by Letters Patent—

The above-described medical compound, substantially as and for the purposes specified.

JOHN FAY.

Witnesses:
JOHN GRIEVES,
ADAM CRAWFORD.